US007346673B1

(12) United States Patent
Oda

(10) Patent No.: US 7,346,673 B1
(45) Date of Patent: Mar. 18, 2008

(54) METHOD AND APPARATUS FOR SELECTING A DEVICE AND A COMPUTER PRODUCT

(75) Inventor: Toshihiko Oda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 983 days.

(21) Appl. No.: 09/658,879

(22) Filed: Sep. 8, 2000

(30) Foreign Application Priority Data

Sep. 9, 1999 (JP) ................................ 11-255097

(51) Int. Cl.
 G06F 15/173 (2006.01)
 G06F 15/16 (2006.01)
(52) U.S. Cl. ...................................... 709/223; 709/208
(58) Field of Classification Search ................ 709/220, 709/223, 327, 208; 710/8; 708/173; 358/1.1, 358/1.15, 3.23
See application file for complete search history.

(56) References Cited

U.S. PATENT DOCUMENTS

| 5,129,639 | A | * | 7/1992 | DeHority | 358/1.15 |
| 5,220,674 | A | * | 6/1993 | Morgan et al. | 709/223 |
| 5,467,434 | A | * | 11/1995 | Hower, Jr. et al. | 358/1.15 |
| 5,502,580 | A | * | 3/1996 | Yoda et al. | 358/518 |
| 5,559,933 | A | * | 9/1996 | Boswell | 358/1.15 |
| 5,580,177 | A | * | 12/1996 | Gase et al. | 400/61 |
| 5,768,516 | A | * | 6/1998 | Sugishima | 709/217 |
| 5,978,557 | A | * | 11/1999 | Kato | 358/1.15 |
| 6,088,120 | A | * | 7/2000 | Shibusawa et al. | 358/1.15 |
| 6,236,464 | B1 | * | 5/2001 | Kohtani et al. | 358/1.15 |
| 6,266,150 | B1 | * | 7/2001 | Brossman et al. | 358/1.15 |
| 6,348,971 | B2 | * | 2/2002 | Owa et al. | 358/1.15 |
| 6,496,859 | B2 | * | 12/2002 | Roy et al. | 709/223 |
| 6,529,286 | B1 | * | 3/2003 | King | 358/1.14 |
| 6,549,654 | B1 | * | 4/2003 | Kumada | 382/162 |
| 6,552,813 | B2 | * | 4/2003 | Yacoub | 358/1.1 |
| 6,609,162 | B1 | * | 8/2003 | Shimizu et al. | 710/15 |
| 6,614,549 | B1 | * | 9/2003 | Hlava | 358/1.15 |
| 6,631,008 | B2 | * | 10/2003 | Aoki | 358/1.15 |
| 6,822,754 | B1 | * | 11/2004 | Shiohara | 358/1.15 |
| 2001/0012117 | A1 | * | 8/2001 | Nakano | 358/1.14 |
| 2003/0011805 | A1 | * | 1/2003 | Yacoub | 358/1.15 |

FOREIGN PATENT DOCUMENTS

| JP | 11-065780 | 3/1999 |
| JP | 11-136477 | 5/1999 |
| JP | 11-203077 | 7/1999 |

OTHER PUBLICATIONS

Scheme for Contect-Sensitive "Intelligent" Help, Knauth, JG, et al., IBM TDB v36, n3, Mar. 1993, IPCOM000104124D, Mar. 1, 1993, p. 247-248.*
Best first strategy for feature selection, LEI, Xu, et al., Pattern Recognition, 9th Intl Conf, Nov. 1988, abstract only.*

* cited by examiner

Primary Examiner—Larry D. Donaghue
(74) Attorney, Agent, or Firm—Dickstein Shapiro LLP

(57) ABSTRACT

All the devices connected to a network are detected and profiles comprising information relating to categories of the detected devices are extracted. Integrated profile comprising information obtained by integrating the profiles of the devices is created. A table containing priority rankings for the use of the devices is created. A user interface enabling necessary categories to be selected from the categories which comprise the integrated profile is created, the execution conditions required by the user are input via this user interface and a device to be used is selected out of all the devices based on the selected categories and the table containing the priority rankings.

15 Claims, 7 Drawing Sheets

FIG.4A

| CATEGORY NAME |
|---|
| MULTIPLE COPIES |
| POSTSCRIPT PRINTING |
| HIGH-RESOLUTION PRINTING |
| SORTING |

FIG.4B

| CATEGORY NAME |
|---|
| MULTIPLE COPIES |
| POSTSCRIPT PRINTING |
| HIGH-RESOLUTION PRINTING |
| SORTING |
| DOUBLE-SIDED PRINTING |
| STAPLING |

FIG.4C

| CATEGORY NAME |
|---|
| MULTIPLE COPIES |
| HIGH-RESOLUTION PRINTING |
| SORTING |
| DOUBLE-SIDED PRINTING |
| PRINTING ON A3 PAPER |

FIG.4D

| CATEGORY NAME |
|---|
| MULTIPLE COPIES |
| POSTSCRIPT PRINTING |
| HIGH-RESOLUTION PRINTING |
| DOUBLE-SIDED PRINTING |
| STAPLING |
| COLOR PRINTING |

FIG.5

| CATEGORY NAME |
| --- |
| MULTIPLE COPIES |
| POSTSCRIPT PRINTING |
| HIGH-RESOLUTION PRINTING |
| SORTING |
| DOUBLE-SIDED PRINTING |
| STAPLING |
| PRINTING ON A3 PAPER |
| COLOR PRINTING |

FIG.6

| PRIORITY RANKING | CATEGORY NAME |
| --- | --- |
| 1 | FIRST PRINTER |
| 2 | SECOND PRINTER |
| 3 | THIRD PRINTER |
| 4 | FOURTH PRINTER |

FIG.7

| 22 | 23 | 21 | 24 |
| --- | --- | --- | --- |
| ○ | a | MULTIPLE COPIES | [ ] |
| × | b | POSTSCRIPT PRINTING | [ ] |
| ○ | c | HIGH-RESOLUTION PRINTING | [ ] |
| × | d | SORTING | [ ] |
| × | e | DOUBLE-SIDED PRINTING | [ ] |
| × | f | STAPLING | [ ] |
| × | g | PRINTING ON A3 PAPER | [ ] |
| × | h | COLOR PRINTING | [ ] |

PRINTER NAME: FIRST PRINTER

25

METHOD AND APPARATUS FOR SELECTING A DEVICE AND A COMPUTER PRODUCT

FIELD OF THE INVENTION

The present invention relates to a method and apparatus for selecting a device most appropriate for a user out of a plurality of devices connected to a network. This invention also relates to a computer product.

BACKGROUND OF THE INVENTION

It is common to connect many devices providing same or similar type of service to a network. A user, who is operating a PC (personal computer) or the like, selects one device out of these many devices to enjoy a service. The specifications of the service which the selected device can provide must conform to the conditions for executing the service requested by the user (settings relating to capability and functions).

Conventionally, the devices which can be used on the network are detected, listed, and notified to the user. The user then selects one device from the list and obtains detailed information relating to the individual functions and capabilities of the selected device. The selected device is used when the user has determined that it is appropriate based on the above information. On the other hand, when the user determines that the device is not appropriate, he selects another device.

However, if a great number of devices are connected to the network, and the user wishes to execute a service under specific or complex conditions, the operation of selecting the device and setting the service conditions for it must be repeated many times until a device is found which is appropriate to the user's requirements. Moreover, the user must input the execution conditions each time. This is inefficient and inconvenient.

Let us consider printing as the service. In this case, many printers are connected to the network. One of these printers is selected (may be by default) and a document, image or the like is printed on this printer. In the case of special cases such as color printing or printing on both sides of a paper, printers which comprise these functions are identified by their names (for example, product names) and selected accordingly. When it is not possible to determine from the names of the printers whether they comprise the required functions, one printer is selected and detailed information relating to its functions and capabilities is checked. When the selected printer does not meet the requirements, the user tries another printer until he finds an appropriate printer.

SUMMARY OF THE INVENTION

It is an object of this invention to make it possible to automatically select a device merely by inputting the conditions for the service which are demanded by the user.

The device selecting apparatus according one aspect of the invention comprises a detecting unit which detects devices connected to a network; an extracting unit which extracts profiles comprising information relating to categories of the detected devices; a table creating unit which creates a table showing priority rankings for the use of the devices; an integrated profile creating unit which creates an integrated profile comprising information obtained by integrating the profiles of the devices; a user interface creating unit which creates a user interface enabling necessary categories to be selected from the categories which comprise the integrated profile; and a selecting unit which selects a device to be used from the devices based on the selection result and the table.

According to the above invention, the user can automatically select a device to be used merely by selecting the necessary categories from category information representing capabilities and functions and the like of the devices. Furthermore, since the necessary categories are selected from an integrated profile comprising information created by integrating profiles of the devices, the user need not clearly specify the device to be selected.

Further, the integrated profile creating unit creates the integrated profile by integrating the most highly capable categories among the profiles of the devices. Accordingly, the user can select the necessary categories from the most highly capable categories of the devices.

Further, the user interface creating unit creates a user interface which displays information relating to the categories comprising the integrated profile to a user and enables the user to select necessary categories the from categories in the display on a screen. Accordingly, the user can easily select the necessary categories from the categories of the devices.

The device selecting apparatus further comprises a memory unit which stores the profiles extracted by the extracting unit. When the selecting unit has consulted the stored profiles and determined that there is no device comprising all the categories which have been selected via the user interface, the selecting unit selects the device which comprises a part of the selected categories. Accordingly, when it is determined that no device comprises all the categories which the user has selected, a device which comprises a part of the multiple selected categories can be selected and used instead.

Further, when a new category has been selected via the user interface after the device has been selected, the selecting unit reselects the device by including the category which has been selected this time by priority in the part of the categories. Accordingly, when a new category has been selected following the selection of one device, a device which comprises the category selected this time can be selected by priority, enabling a device to be selected in accordance with the user's intentions.

Further, the devices are printers. Therefore, to automatically select a printer to be used, the user need only select the necessary categories from category information representing capabilities and functions and the like of the printers.

A device selecting method according to another aspect of this invention comprises the steps of providing beforehand a table showing an integrated profile, comprising information obtained by integrating profiles comprising information relating to categories of devices which are connected to a network, and priority rankings for the use of the devices; creating a user interface which enables necessary categories to be selected from the categories comprising the integrated profile; and selecting a device to be used from the devices based on the selection result and the table.

Accordingly to the above invention, in order to automatically select a device to be used, the user need only select the necessary categories from category information representing capabilities and functions and the like of the devices. Furthermore, since the necessary categories are selected from an integrated profile comprising information created by integrating profiles of the devices, the user need not clearly specify the device to be selected.

Further, the step of providing creates the integrated profile by integrating the most highly capable categories among the profiles of the devices. Accordingly, the user can select the necessary categories from the most highly capable categories of the devices.

Further, the step of creating a user interface creates a user interface which displays information relating to the categories comprising the integrated profile to a user and enables the user to select necessary categories the from categories in the display on a screen. Accordingly, the user can easily select the necessary categories from the categories of the devices.

The device selecting method further comprises a step of providing the profiles beforehand. When the stored profiles have been consulted and it has been determined that there is no device comprising all the categories which have been selected via the user interface, the step of selecting selects the device which comprises a part of the selected categories. When it is determined that no device comprises all the categories which the user has selected, a device which comprises a part of the multiple selected categories can be selected and used instead.

Further, when a new category has been selected via the user interface after the device has been selected, the step of selecting reselects the device by including the category which has been selected this time by priority in the part of the categories. Therefore, when a new category has been selected following the selection of one device, a device which comprises the category selected this time can be selected by priority, enabling a device to be selected in accordance with the user's intentions.

The computer-readable memory medium according to still another aspect of this invention which stores programs for allowing a computer to execute the steps of detecting devices connected to a network; extracting profiles comprising information relating to categories of the detected devices; creating a table showing priority rankings for the use of the devices; creating an integrated profile comprising information obtained by integrating the profiles of the devices; creating a user interface enabling necessary categories to be selected from the categories which comprise the integrated profile; and selecting a device to be used from the devices based on the selection result and the table.

Accordingly to the above invention, in order to automatically select a device to be used, the user need only select the necessary categories from category information representing capabilities and functions and the like of the devices. Furthermore, since the necessary categories are selected from an integrated profile comprising information created by integrating profiles of the devices, the user need not clearly specify the device to be selected.

Other objects and features of this invention will become apparent from the following description with reference to the accompanying drawings.

BRIEF DESCRIPTION OF THE DRAWINGS

FIG. 4A to FIG. 4D are diagrams showing examples of profiles of devices gathered by the device selecting apparatus;

FIG. 5 is a diagram showing an example of an integrated profile which is created by the device selecting apparatus;

FIG. 6 is a diagram showing an example of a priority ranking table which is created by the device selecting apparatus;

FIG. 7 is a plan view of a screen display illustrating an operation of the device selecting apparatus;

DESCRIPTION OF THE PREFERRED EMBODIMENTS

Figure 1:
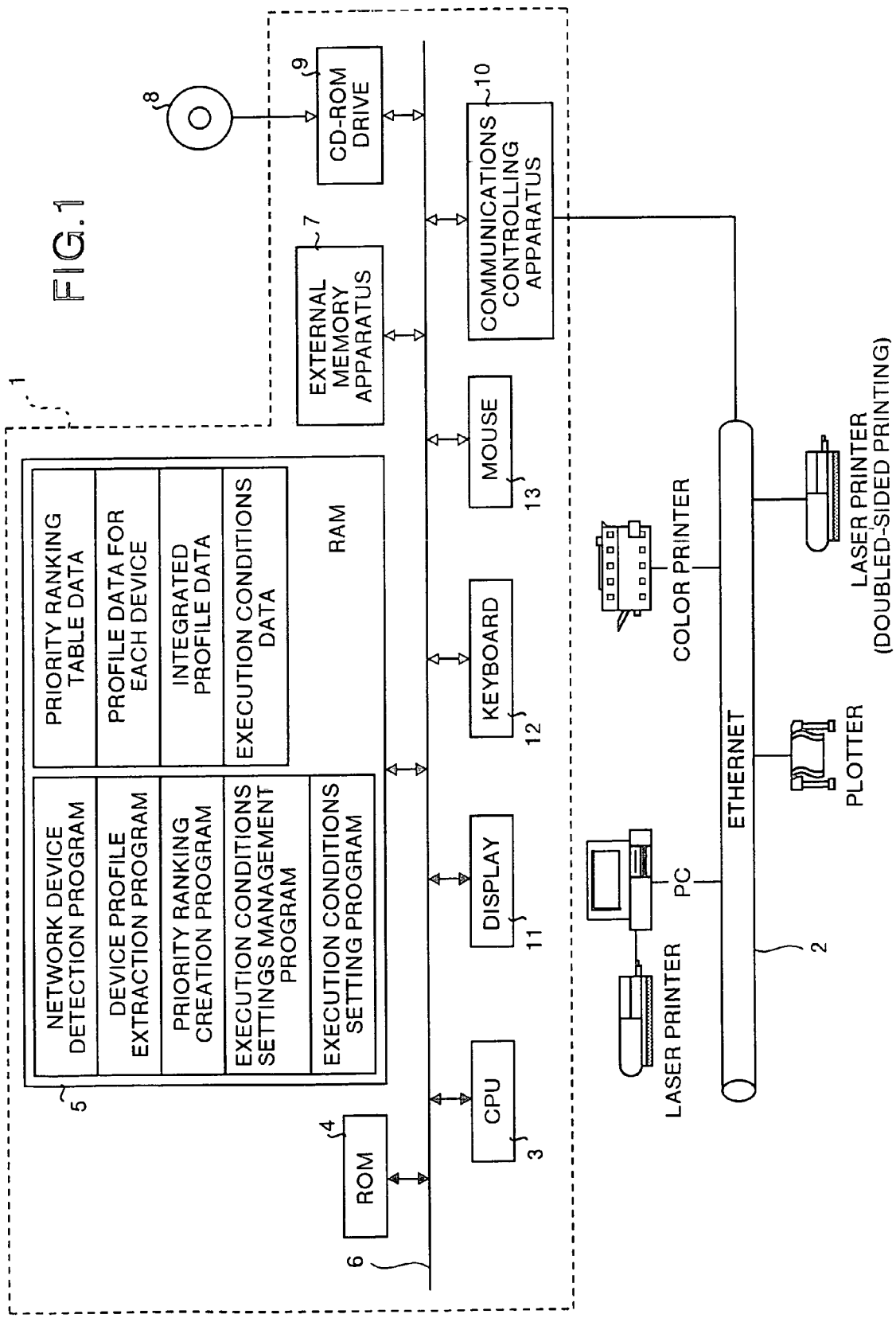
FIG. 1 is a block diagram showing the hardware constitution of a device selecting apparatus according to an embodiment of this invention.

A preferred embodiment of the present invention will be explained below with reference to the drawings. FIG. 1 is a block diagram showing the hardware constitution of a device selecting apparatus according to an embodiment of this invention. As shown in FIG. 1, the device selecting apparatus 1 comprises a PC connected to a network 2 such as the internet. In addition to the device selecting apparatus 1, a plurality of other devices are connected to the network 2.

In the device selecting apparatus 1, a ROM 4 which stores BIOS and the like and a RAM 5 which stores various types of rewritable data are connected to a CPU 3 via a bus 6. Following devices are also connected to the bus 6 via an interface (not shown in the diagram) and various control circuits (not shown in the diagram). That is, an external memory apparatus 7 such as a hard disk which stores various types of programs and fixed data, a CD-ROM drive 9 which reads the contents of a CD-ROM 8 comprising a memory medium, a communications controlling apparatus 10 which controls communications between the device selecting apparatus 1 and the network 2, a display 11, a keyboard 12, and a mouse 13.

Programs described later are stored in the CD-ROM 8. The programs stored on the CD-ROM 8 are read using the CD-ROM drive 9 and installed on the external memory apparatus 7. These programs operate on a predetermined OS. Instead of the CD-ROM 8, a variety of memory media such as a floppy disk, an optical magnetic disk, and a DVD may be used.

Following is the list of the examples of such programs.

1. Network Device Detection Program: a program for detecting devices connected to the network 2. The program detects not only devices (other than PC) which are connected directly to the network 2 but also devices which are connected thereto via a PC.

2. Device Profile Extraction Program: a program for extracting information (termed "profiles") relating to categories of functions and capabilities of each of the devices detected in the program "1". A profile is expressed as a collection of categories, the categories comprising category name, type of category value, and initial value. The type of category value represents the range of values obtained for that category. For example, a list of whole integers or specific numbers is specified. An example of a category is category name: number of prints, type of category value: natural number, initial value: 1", and such like.

3. Priority Ranking Creation Program: a priority ranking table ranks the devices according to the priority of their execution. This program creates a table which ranks a plurality of devices based on a predetermined reference.

4. Execution Conditions Settings Management Program: a program which creates an integrated profile based on the collected profiles of the devices and manages the conditions for executing service based on this integrated profile information, information input in a user interface environment explained later, and the priority ranking table. The integrated profile is a profile integrating the categories of the devices so as to form a sum total of the most highly capable categories which make up the profiles of the devices. The integrated profile constitutes a profile of an ideal virtual device comprising all the capabilities of the devices.

5. Execution Conditions Setting Program: a program which realizes a user interface, in which the user sets the execution conditions. These execution conditions may be set using the display 11, the mouse 13, the keyboard 12 and the like. An example of a screen display based on this user interface will be explained later with reference to FIG. 3.

Subsequently, processes from setting conditions for executing a program with regard to the devices connected to the network 2 to specifying the execution of the program will be explained with reference to the flowchart shown in FIG. 2.

Figure 2:
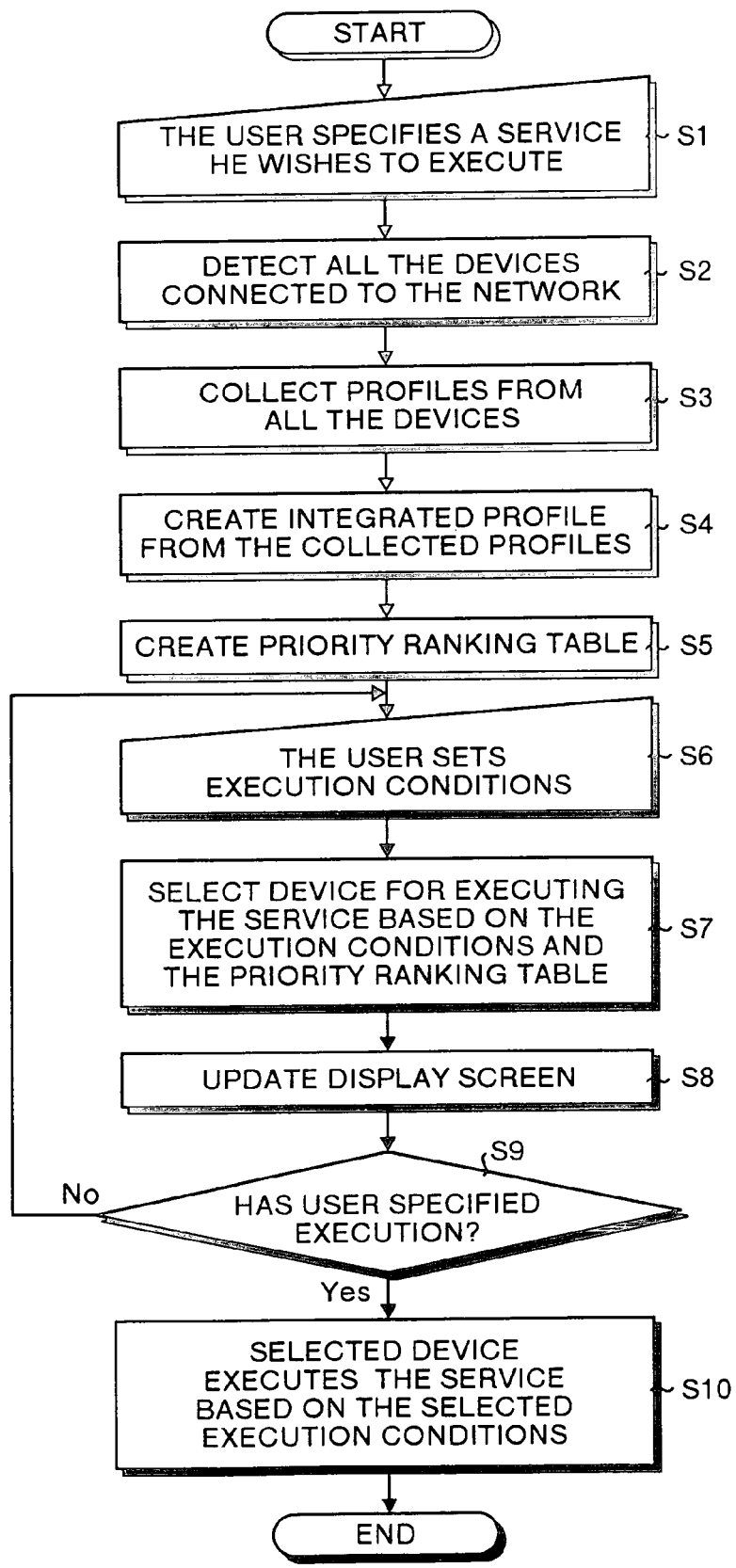
FIG. 2 is a flowchart showing an operation of the device selecting apparatus.

As shown in FIG. 2, the user specifies the service he wishes to execute. This specification of service may be performed via a user interface which has been established by the execution conditions setting program (step S1). Then, the CPU 3 executes the network device detection program and thereby detect all the devices which are connected to the network and are capable of executing the specified service (step S2). Step S2 realizes the detecting unit and the detection step.

Based on the device profile extraction program, the CPU 3 extracts information (profiles) representing the categories of the devices which were detected in the step S2 (step S3). Based on the execution conditions settings management program, the CPU 3 creates an integrated profile which collects the most highly capable categories from the profiles of the devices (step S4). Based on the priority ranking table creation program, the CPU 3 creates a priority ranking table (step S5). The data of the profiles of the devices extracted in the step S3, the data of the integrated profile created in the step S4 and the data of the priority ranking table created in the step S5 are stored in the RAM 5 (see FIG. 1). The memory unit and memory step is realized by storing the data of the profiles of the devices which were extracted in the step S3 in the RAM 5. Furthermore, the step S3 also realizes the profile extracting unit and the profile extracting step. The step S4 realizes the integrated profile creating unit and the integrated profile creating step. The step S5 realizes the table creating unit and the table creating step. The steps S3 to S5 achieve the preparatory processes.

Figure 3:
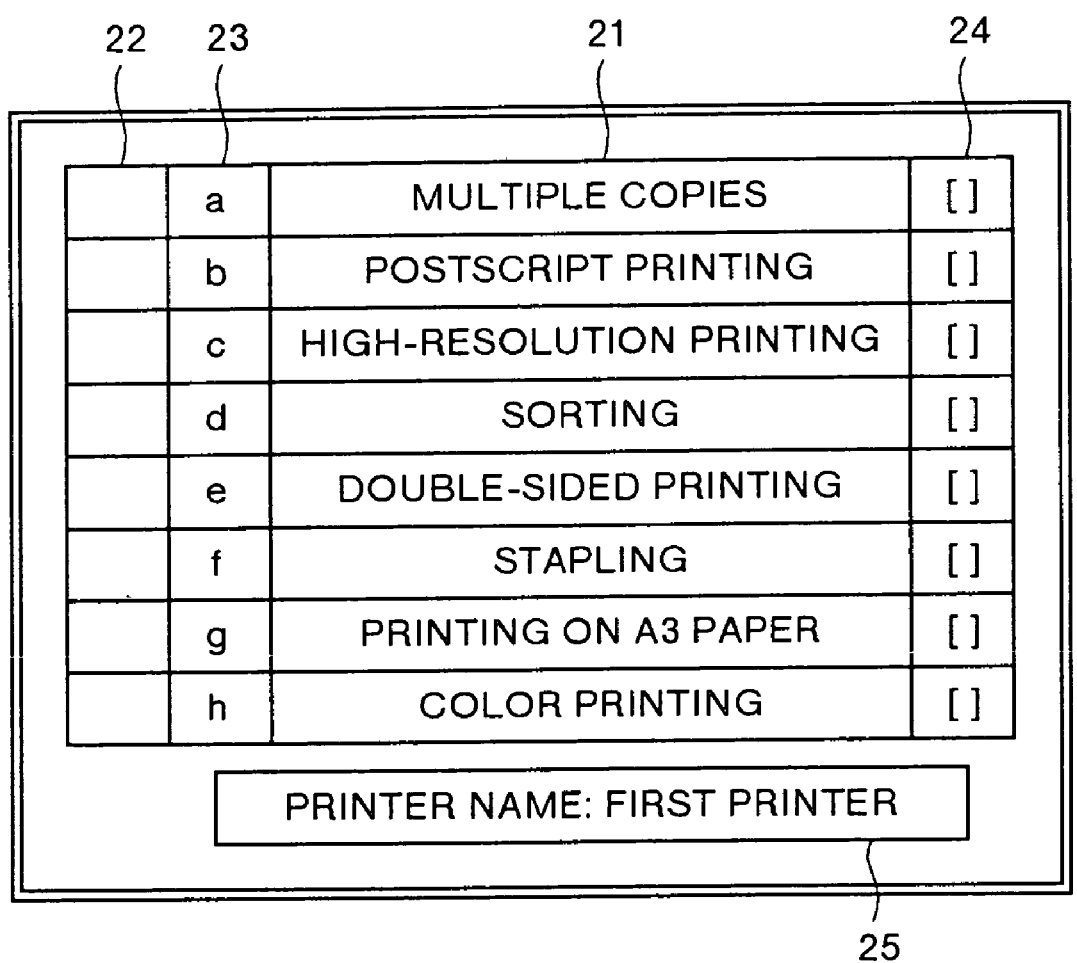
FIG. 3 is a plan view of a screen display based on a user interface which is used in the device selecting apparatus.

The user inputs desired service conditions via the user interface for setting execution conditions which was created by the CPU 3 based on the execution conditions setting program (step S6). FIG. 3 shows one example of a screen displayed on the display 11 by this user interface. This example relates to printers which are connected to the network 2. Accordingly, as shown in FIG. 3, the screen display lists category names 21 of printers registered in the integrated profile. In the example of FIG. 3, the category names 21 list functions for producing multiple prints, printing a postscript, and the like. A check box 22 enables the user to select the categories represented by the category names 21 and is shown in correspondence therewith. The user can click on the check box 22 with the mouse 13 and select a category from the category names 21. Category numbers 23 are appended to the category names 21 and displayed in correspondence with therewith. An invalid setting category number display column 24 (the function of this column will be explained in detail later) shows the category numbers 23 which have been made invalid for setting and is displayed in correspondence with the category names 21. A printer name display column 25 displays the name of the printer which is presently selected, and is displayed below the column displaying the category names 21. Creating the user interface in compliance with the execution conditions setting program realizes the user interface creating unit and the user interface creating step. The execution conditions which were input in the step S6 are stored in the RAM 5 as execution conditions data (see FIG. 1).

In accordance with the information representing the execution conditions which were input in the step S6, the CPU 3 refers to the profile data of the devices which is stored in the RAM 5 in compliance with the execution conditions settings management program, and selects the device among the devices satisfying the execution conditions which is ranked highest in the priority ranking table (step S7). This realizes the selecting unit and the selecting step.

When the user changes the setting for a category A, leading to a contradiction between the category A and a category B which is already set, the category B is made invalid and the category number 23 of the category A is added to the invalid setting category number display column 24 of the category B. "Contradiction" signifies that there are no devices capable of executing the category B setting among the devices capable of executing the category A setting.

In this case, device comprising a part of all the categories selected by the user in the check box 22 are selected. That is, categories for which a category number 23 of another category is displayed in the invalid setting category number display column 24 are deleted from all the categories selected by the user, and the devices comprising the remaining categories are selected.

Sometimes the category B, which was made invalid to eliminate a contradiction, may become valid when the user changes the setting of the category A. This happens when there is a device which satisfies the settings of both categories A and B.

Following the step S7, the screen display is updated based on the result of the step S7 (step S8). When the user specifies execution (YES in step S9), the selected device executes the service based on the selected execution conditions (step S10).

When the user does not specify execution in the step S9, that is, when the user further adds or changes the services he wishes to execute via the user interface established by the execution conditions setting program (NO in the step S9, step S6), the process from the step S7 onwards are repeated.

When a contradiction arises after the user selects a new category in the check box 22 in the step S6, the category which has been selected this time is not deleted but is kept by priority, without displaying the category number 23 of any of the other categories in the invalid setting category number display column 24 of the category which has been selected this time. Consequently, a device is always selected which comprises the category which has been selected this time in the step S7.

Subsequently, a specific example of the processes of the steps S6 to S9 will be explained. For the sake of simplicity, the profile category type is a logical type having a value which indicates only whether the profile has the category or does not have it. In this example, four printers (first to fourth printers) are provided on the network 2 as devices capable of executing printing. FIG. 4A shows the profile of the first printer, FIG. 4B shows the profile of the second printer, FIG. 4C shows the profile of the third printer, and FIG. 4D shows the profile of the fourth printer. In FIG. 4A to FIG. 4D, the category names 21 show the categories of the category name 21 of each printer.

FIG. 5 shows an integrated profile which is created by collecting from these four profiles the categories which have the highest capabilities. FIG. 6 shows a priority ranking table which is created based on a predetermined reference for determining (e.g. faster in printing, installed nearby, etc.). As shown in FIG. 6, the first printer is the default and is number one in the priority ranking. Two categories, multiple printing and high resolution printing, are selected by default from the start. FIG. 7 shows a screen display in the initial state of setting the execution conditions (step S6). As shown in FIG. 7, all the category names 21 which makeup the integrated profile of FIG. 5, and the check boxes 22, category numbers 23 and the invalid setting category number display columns 24 corresponding to the category names 21 are displayed on the screen.

"O" is displayed in the check boxes 22 of the two categories of multiple printing and high resolution printing which are selected by default from the start, and "X" is displayed in all the other check boxes 22. The default first printer is displayed in the printer name display column 25.

Figure 8:
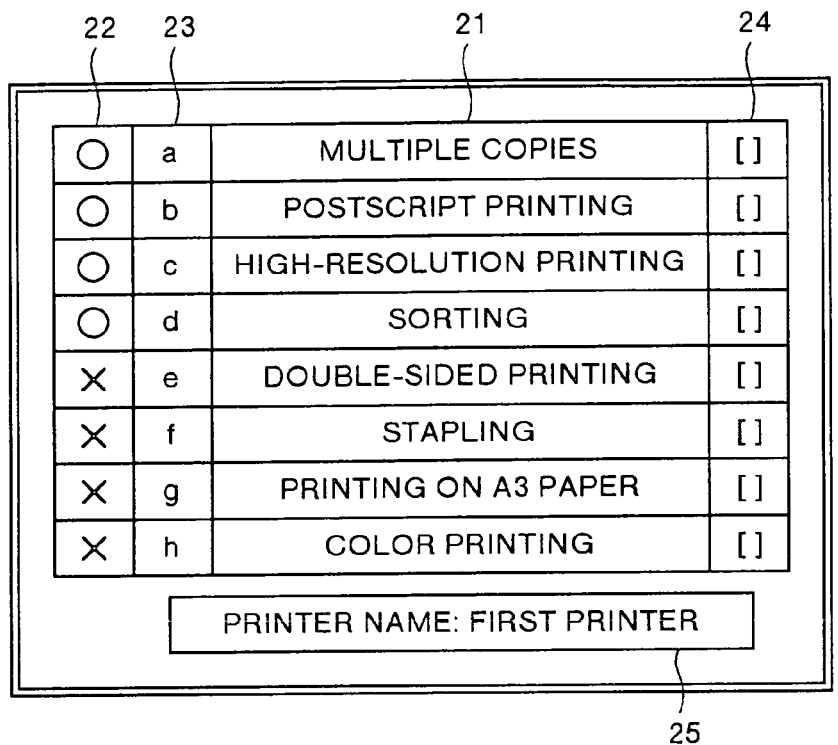
FIG. 8 is a plan view of a screen display illustrating an operation of the device selecting apparatus.

Suppose "postscript printing" and "sorting" are selected on the screen. The printers capable of satisfying these printing conditions are the first and second printers according to the profiles of FIG. 4A to FIG. 4D. The first printer will selected based on its priority ranking in the priority ranking table. FIG. 8 shows the display on the screen at this point.

Figure 9:
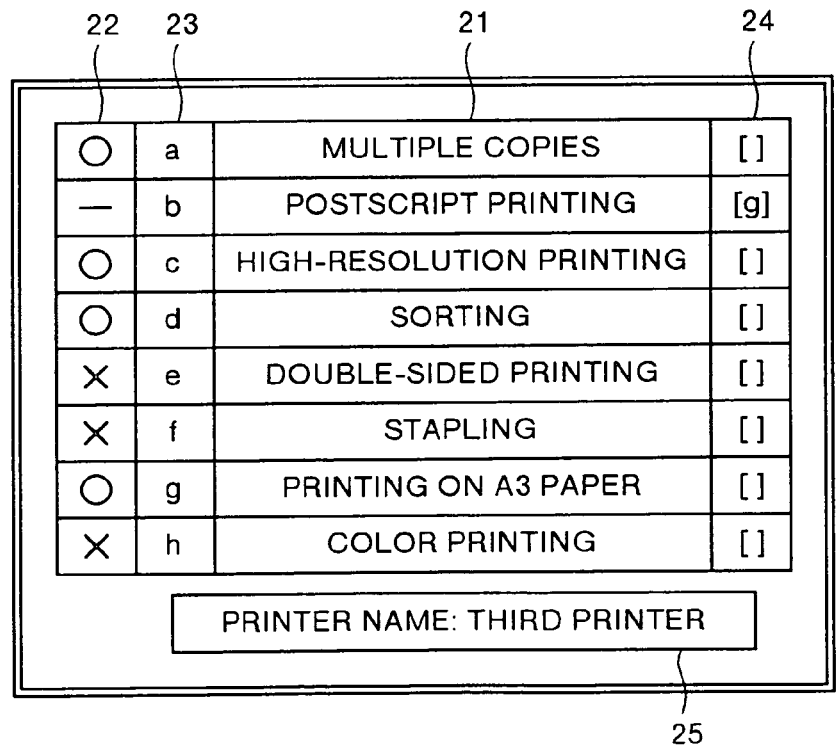
FIG. 9 is a plan view of a screen display illustrating an operation of the device selecting apparatus.

Suppose "printing on A3 paper" is selected on the screen. According to the profiles of FIG. 4A to FIG. 4D, only the third printer has this function, and will therefore be selected. Since the third printer cannot perform postscript printing, this category is made invalid by displaying the symbol "-" in the check box 22 corresponding to postscript printing. In order to clearly show that postscript printing has been made invalid due to the selection of printing on A3 paper, the category number 23 "g", which is the category number 23 for printing on A3 paper, is added to the invalid setting category number display column 24 which corresponds to postscript printing. FIG. 9 shows the display on the screen at this point.

Figure 10:
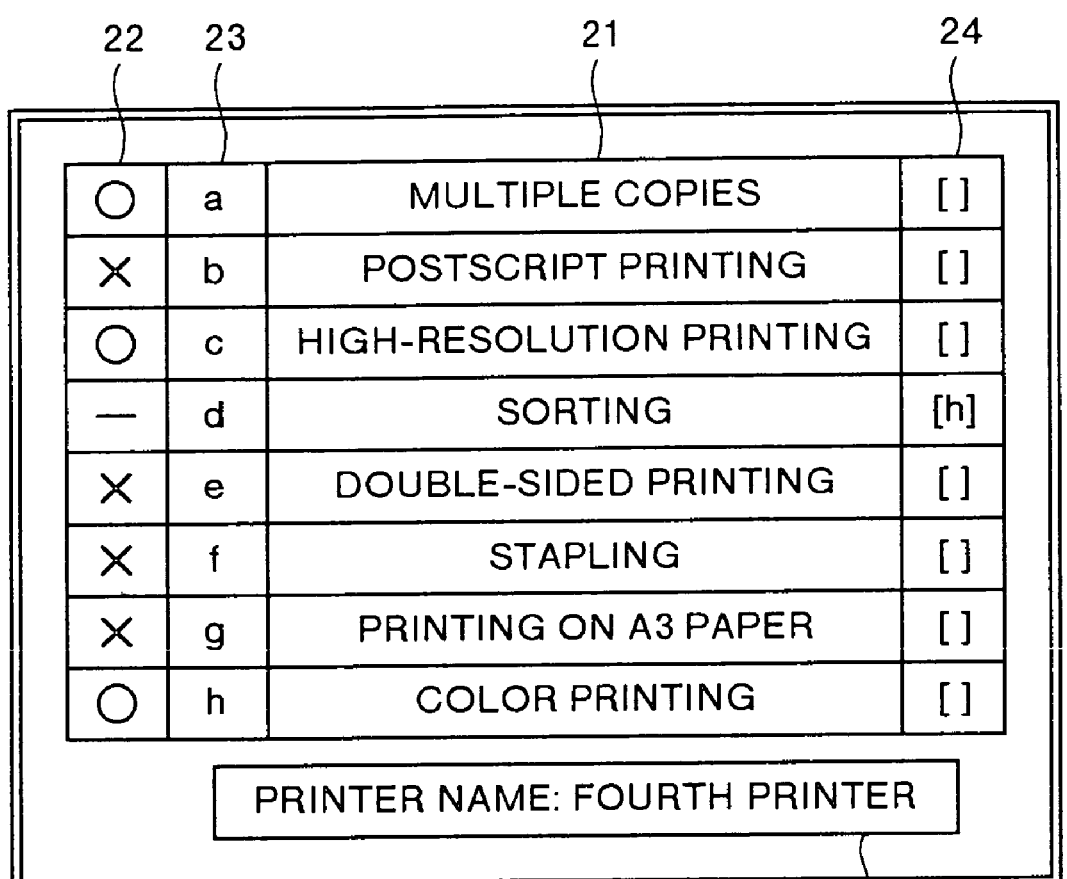
FIG. 10 is a plan view of a screen display illustrating an operation of the device selecting apparatus.

When the user cancels printing on A3 paper and selects color printing, the fourth printer is selected. Now postscript printing becomes valid. FIG. 10 shows the display on the screen at this point. Since postscript printing has been made valid, the display may be returned to the initial state shown in FIG. 7 or to the previous setting shown in FIG. 8. In this example, the former is carried out. Since the fourth printer does not have a sorting function that category is made invalid by inserting "-" in the check box 22 corresponding to sorting. In order to clearly show that sorting has been made invalid due to the selection of color printing, the category number 23 "h", which is the category number 23 of color printing, is added to the invalid setting category number display column 24 which corresponds to sorting.

According to the above-described device selecting apparatus 1, to automatically select a device to be used, the user need only select the necessary categories from category information representing capabilities and functions and the like of the devices.

The necessary categories are selected from an integrated profile comprising information created by integrating profiles of the devices. Therefore, the user need not clearly specify the device to be selected.

The integrated profile is created by integrating the most highly capable categories in the profiles of the devices. Therefore, the user can select the necessary categories from the most highly capable categories of the devices.

The user interface displays information relating to the categories which make up the integrated profile to the user on the display 11. The user can select the necessary categories from among those displayed on the display 11. Therefore, the user is able to select the necessary categories from the categories of the devices easily.

In the step S7, when no device comprises all the categories which have been selected by the user, a device which comprises a part of the selected multiple categories can be selected instead. In this case, when a new category has been selected following the selection of one device (YES in step S9, step S6), a device which comprises the category selected this time can be selected by priority, enabling a device to be selected in accordance with the user's intentions.

According to the present invention, in order to automatically select a device to be used, the user need only select the necessary categories from category information representing capabilities and functions and the like of the devices. Furthermore, since the necessary categories are selected from an integrated profile comprising information created by integrating profiles of the devices, the user need not clearly specify the device to be selected.

Further, the user can select the necessary categories from the most highly capable categories of the devices.

Further, the user can easily select the necessary categories from the categories of the devices.

Further, when it is determined that no device comprises all the categories which the user has selected, a device which comprises a part of the multiple selected categories can be selected and used instead.

Further, when a new category has been selected following the selection of one device, a device which comprises the category selected this time can be selected by priority, enabling a device to be selected in accordance with the user's intentions.

Further, to automatically select a printer to be used, the user need only select the necessary categories from category information representing capabilities and functions and the like of the printers.

The present document incorporates by reference the entire contents of Japanese priority documents, 11-255097 filed in Japan on Sep. 9, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device detecting apparatus for detecting an appropriate device from a number of devices connected to a network, said apparatus comprising:
   a detecting unit which detects all the devices connected to said network;
   an extracting unit which extracts from the devices, corresponding profiles, each of said profiles comprising information related to functions of said devices;
   an integrated profile creating unit which integrates the profiles of said devices so as to create an integrated profile, said integrated profile being a profile of an ideal virtual device having every function of said devices;

a user interface creating unit which creates a user interface enabling a user to select necessary functions from the functions of the integrated profile created by said integrated profile creating unit;

a table creating unit which creates a table related to a priority order of said devices, the priority order being based on the number of user selected functions available in each device;

an updated integrated profile creating unit for creating an updated integrated profile of an updated virtual device having every function of the devices having the user selected functions; and a selecting unit which selects a device as a device to be used out of said devices based on the selected functions and the table.

2. The device selecting apparatus according to claim 1, wherein the user interface created by the user interface creating unit displays information relating to functions in the integrated profiles according to categories and enables the user to select categories of functions.

3. The device selecting apparatus according to claim 1, further comprising:

a memory unit, for storing profiles extracted by said extracting unit, wherein if the selecting unit cannot select a device having a profile which includes every function selected by the user, the selecting unit selects a device having a profile which includes a subset of every function selected by the user.

4. The device selecting apparatus according to claim 3, wherein if the user changes a selection of a set of functions from the integrated profile, the selecting unit reselects the device to be used based on the selection and the table.

5. The device selecting apparatus according to claim 1, wherein said devices are printers.

6. A machine-implemented method for selecting an appropriate device in a network, the method comprising:

detecting a plurality of devices connected to the network;

extracting, from each of the plurality of devices, a plurality of profiles, each of the profiles comprising information related to functions of a corresponding one of said plurality of devices;

integrating said plurality of profiles to create an integrated profile, said integrated profile being a profile of an ideal virtual device having every function of said devices;

creating a user interface for permitting a user to select a set of functions from the integrated profile;

creating a table, the table specifying a preferred priority order for use of the devices, the priority order being based on the number of user selected functions available in each device;

creating an updated integrated profile of an updated virtual device having every function of the devices having the user selected functions; and selecting one of the devices based on the set of functions selected by the user from the user interface and the preferred priority order specified by the table.

7. The device selecting method according to claim 6, wherein the user interface displays information relating to functions in the integrated profile according to categories to enable the user to select categories of functions.

8. The device selecting method according to claim 6, wherein in said step of selecting, if there is no device having a profile which includes every function selected by the user, said step of selecting selects a device having a profile which includes a subset of every function selected by the user.

9. The device selecting method according to claim 8, further comprising:

re-executing said step of selecting if the user changes a set of functions selected from the integrated profile.

10. The device selecting method according to claim 6, wherein said devices are printers.

11. A computer readable medium for storing instructions, which when executed by a computer, causes the computer to perform the steps of:

detecting a plurality of devices connected to a network;

extracting, from each of the plurality of devices, a plurality of profiles, each of the profiles comprising information related to functions of a corresponding one of said plurality of devices;

integrating said plurality of profiles to create an integrated profile, said integrated profile being a profile of an ideal virtual device having every function of said devices;

creating a user interface for permitting a user to select a set of functions from the integrated profile;

creating a table, the table specifying a preferred priority order for use of the devices, the priority order being based on the number of user selected functions available in each device;

creating an updated integrated profile of an updated virtual device having every function of the devices having the user selected functions; and selecting one of the devices based on the set of functions selected by the user from the user interface and the preferred priority order specified by the table.

12. The computer readable medium according to claim 11, wherein said steps cause the user interface to display information relating to functions in the integrated profile according to categories to enable the user to select categories of functions.

13. The computer readable medium according to claim 11, wherein in said step of selecting, if there is no device having a profile which includes every function selected by the user, said step of selecting selects a device having a profile which includes a subset of every function selected by the user.

14. The computer readable medium according to claim 11, wherein the steps further comprise:

re-executing said step of selecting if the user changes a set of functions selected from the integrated profile.

15. The computer readable medium according to claim 11, wherein said devices are printers.

* * * * *